US012767319B2

(12) United States Patent
Turan et al.

(10) Patent No.: US 12,767,319 B2
(45) Date of Patent: Oct. 20, 2026

(54) FORCE MEASUREMENT SYSTEM

(71) Applicant: TUSAS-TURK HAVACILIK VE UZAY SANAYII ANONIM SIRKETI, Kahramankazan/Ankara (TR)

(72) Inventors: Ozcan Turan, Kahramankazan/Ankara (TR); Kamran Samet, Kahramankazan/Ankara (TR); Dilan Kutmaral, Kahramankazan/Ankara (TR); Erdem Dirik, Kahramankazan/Ankara (TR)

(73) Assignee: TUSAS- TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 274 days.

(21) Appl. No.: 18/707,047

(22) PCT Filed: Oct. 24, 2022

(86) PCT No.: PCT/TR2022/051173
§ 371 (c)(1),
(2) Date: May 2, 2024

(87) PCT Pub. No.: WO2023/091114
PCT Pub. Date: May 25, 2023

(65) Prior Publication Data

US 2025/0010975 A1 Jan. 9, 2025

(30) Foreign Application Priority Data

Nov. 19, 2021 (TR) ................................ 2021/018065

(51) Int. Cl.
*B64C 13/04* (2006.01)
*G01L 1/22* (2006.01)
*G01L 5/22* (2006.01)

(52) U.S. Cl.
CPC ........ *B64C 13/0421* (2018.01); *G01L 1/2287* (2013.01); *G01L 5/223* (2013.01)

(58) Field of Classification Search
CPC ....... G01L 1/22; G01L 1/2287; G01L 5/0028; G01L 5/223; B64C 13/04; B64C 13/0421;
(Continued)

(56) References Cited

U.S. PATENT DOCUMENTS

| | | | | |
|---|---|---|---|---|
| 5,522,568 | A | 6/1996 | Kamen | |
| 9,469,393 | B2 * | 10/2016 | Antraygue | G05D 1/0077 |
| 2010/0305780 | A1 | 12/2010 | Sataka | |

FOREIGN PATENT DOCUMENTS

| | | | |
|---|---|---|---|
| CN | 102252796 | A | 11/2011 |
| CN | 112623257 | A | 4/2021 |

(Continued)

OTHER PUBLICATIONS

International Search Report and Written Opinion for PCT application No. PCT/TR2022/051173, mailed Mar. 2, 2023.

*Primary Examiner* — Benjamin R Schmitt
(74) *Attorney, Agent, or Firm* — Notaro, Michalos & Zaccaria P.C.

(57) ABSTRACT

A control stick extending outward from a body located at an air vehicle enables the pilot to control tasks such as position and speed of the air vehicle. A strain gauge arm located on a control line in connection with the control stick measures a strain transferred to the control stick. A trim actuator located on the related strain gauge arm on the control line measures positional changes of the air vehicle. A sensor located on the strain gauge arm generates force data at a rate predetermined by the user upon a force exerted on the control stick. A control unit receives force data from sensors and positional percentage values from the trim actuator.

9 Claims, 2 Drawing Sheets

Figure 1:
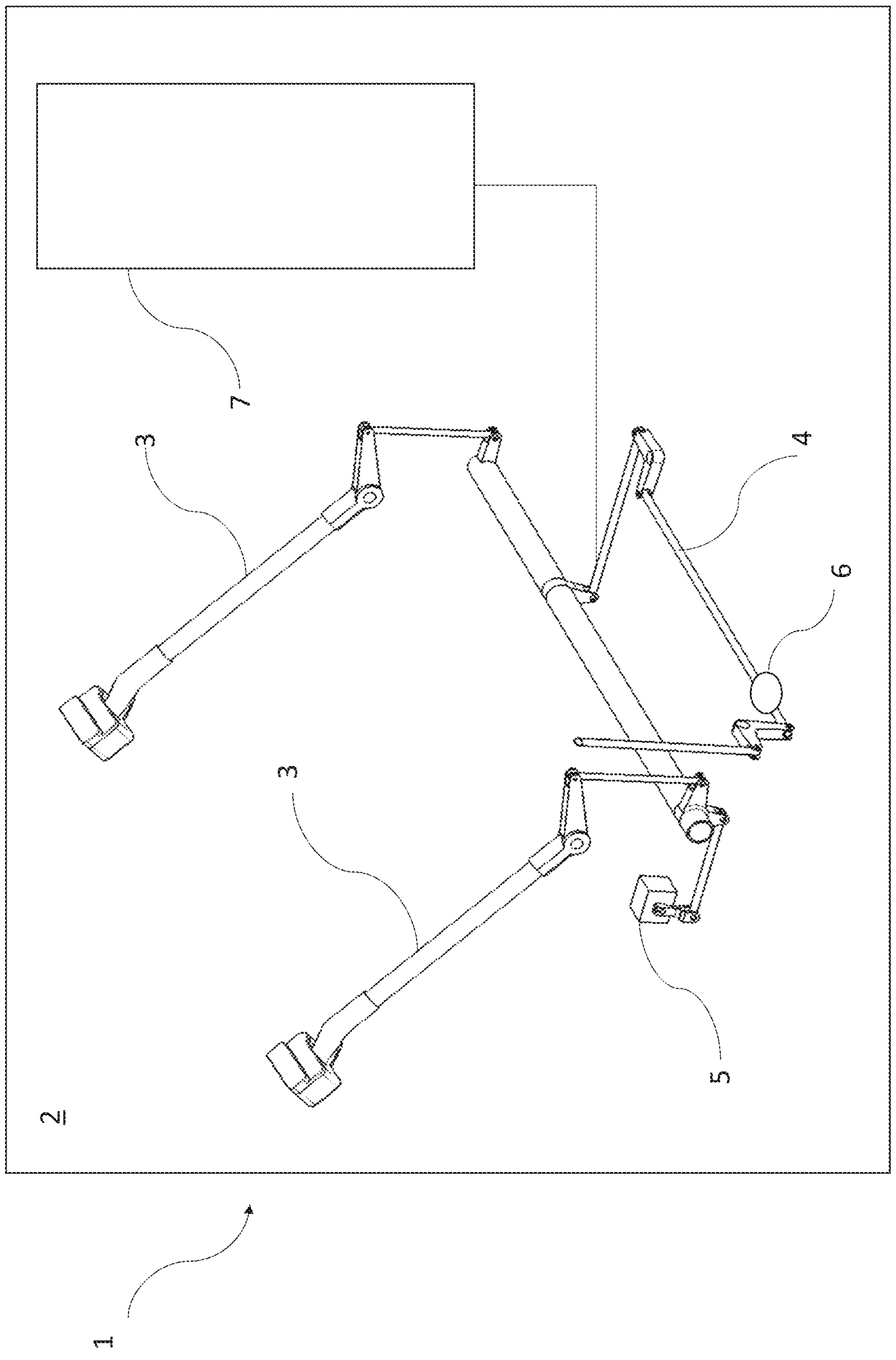

(58) Field of Classification Search
CPC ..... B64C 13/0427; B64C 13/16; B64C 27/56; B64C 27/57; G05D 3/20
See application file for complete search history.

(56) References Cited

FOREIGN PATENT DOCUMENTS

| | | | | | |
|---|---|---|---|---|---|
| GB | 2549272 | A | * | 10/2017 | ............. B64C 13/12 |
| WO | WO-2009104288 | A1 | * | 8/2009 | ............. B64C 13/12 |

* cited by examiner

FORCE MEASUREMENT SYSTEM

This invention relates to systems for measuring a force exerted by a pilot on a control stick in test systems used in air vehicles.

One of the most important parameters that determine the pilot's quality of use in air vehicles, especially helicopters, is the force characteristic of the flight control system. Factors such as friction, weight, balancing springs and reversible loads of the system affect the force value. These force values, which also affect the system design in prototype helicopters, are measured in ground tests and flight tests. In this case, manual measurements are made by a user using a force meter in ground tests. During flight tests, these measurements cannot be made manually by the user. Therefore, force measurement can be performed with tools such as strain gauges and force transducers.

The United States patent document U.S. Pat. No. 5,522,568, which is included in the known-state of the art, discloses a system which is connected with a control stick to automatically perform trim control by measuring a force exerted by the pilot on the control stick by means of the strain gauge arm.

Thanks to a force measurement system according to the present invention, loads on the control stick are measured by means of the strain gauge arms, and the force exerted by the pilot on the related stick and pedal elements is calculated by using an algorithm created according to this measurement data.

Another object of the present invention is to ensure the accuracy of the values—which are obtained by a manual force measurement method—of the forces exerted by the pilot on the elements such as sticks and pedals, while the air vehicle is in a prototype stage.

Another object of the present invention is to provide a substantially accurate calculation of the force value exerted by the pilot to the related elements such as sticks and pedals, according to the position change of the air vehicle.

A further object of the present invention is to provide a simple, easy to use, practical, and effective force measurement system which is realized without using an extra equipment.

The force measurement system realized to achieve the object of the present invention, which is defined in the first claim and the other claims dependent thereon, comprises a body provided at air vehicles; a control stick located on the body to extend outward from the body in which the pilot performs tasks such as air vehicle position, speed, etc. It comprises at least one strain gauge arm located on the body in connection with the control stick, for measuring a strain for the control stick. It comprises a control line to which the strain gauge arm is connected; at least one trim actuator measuring positional changes. It comprises at least one sensor on the strain gauge arm, which generates force data at a rate predetermined by the user; a control unit to which the force data from the sensors and the positional percentage values from the trim actuator are transmitted.

The force measurement system according to the invention comprises the control unit comprising the following algorithmic steps for the positional change movements of the air vehicle that allow:

Calculating an initial average force data on the strain gauge arms before the air vehicle is run and commands are issued by the pilot;

Taking an arithmetic average of the force data predetermined by the user and transferred to the control unit, so that an average force data is calculated and transferred to the control unit;

Checking whether the trim actuator is activated or deactivated;

Depending on the positional percentage value lower or higher than a reference percentage value predetermined by the user, calculating ratio values by the control unit with a formula predetermined by the user, such that the positional percentage value and the reference percentage value are at least partially different from each other;

Calculating a final force value by subtracting the initial average force data from the average force data and dividing this value by the ratio value;

Calculating a final force exerted by the pilot on the control stick/pedal according to the position of the air vehicle, such as forward-backward or up-down movements, right-left turns, etc.

In an embodiment of the invention, the force measurement system comprises the strain gauge arms located such that the force data received through the sensors on the strain gauge arm is in connection with the control stick without direct contact with the pilot. It comprises an algorithm calculating the final force value exerted by the pilot on the equipment such as sticks and pedals on the control line.

In an embodiment of the invention, the force measurement system comprises a plurality of sensors located on each strain gauge arm in connection with the control stick for equipment such as sticks and pedals for control commands such as pitch-yaw movement, drifting of the air vehicle, wherein the sensors allow individual measurement for each command with a plurality of strain gauge arms; and a trim actuator. It comprises the control unit which processes the force data received by the sensors located on each strain gauge arm individually, and calculates the force exerted by the pilot on the control stick.

In an embodiment of the invention, the force measurement system comprises sensors which measure bidirectional force data such as tension-compression by means of a full bridge strain gauge over strain gauge arms.

In an embodiment of the invention, the force measurement system comprises the control unit which checks that the positional percent value of the trim actuator is between the previous and the next positional percent value.

In an embodiment of the invention, the force measurement system comprises the control unit which calculates the final force value by performing the force data measurements made by the sensor on the strain gauge arm in a predetermined number and time by the user, and by taking the arithmetic average of the force data measurements.

In an embodiment of the invention, the force measurement system comprises the control unit which allows the user to obtain data in distinguishable numbers by dividing the calculated force data with the ratio calculated with the formulas predetermined by the user, depending on the position information received from the trim actuator, due to the very low use force values especially in non-reversible mechanical flight control systems.

In an embodiment of the invention, the force measurement system comprises the control unit having an algorithm that calculates the final force value exerted by the pilot on air vehicle control equipment such as sticks and pedals on the control line, by means of the force data received by the sensors and the position information obtained by suitable trim actuators while the air vehicle is in the prototype stage or in flight, without using any extra equipment.

In an embodiment of the invention, the force measurement system comprises the body located on the air vehicle which is an aircraft or a helicopter.

The force measurement system realized to achieve the object of the present invention is illustrated in the attached drawings, in which:

FIG. 1—is a perspective view of the force measurement system.

Figure 2:
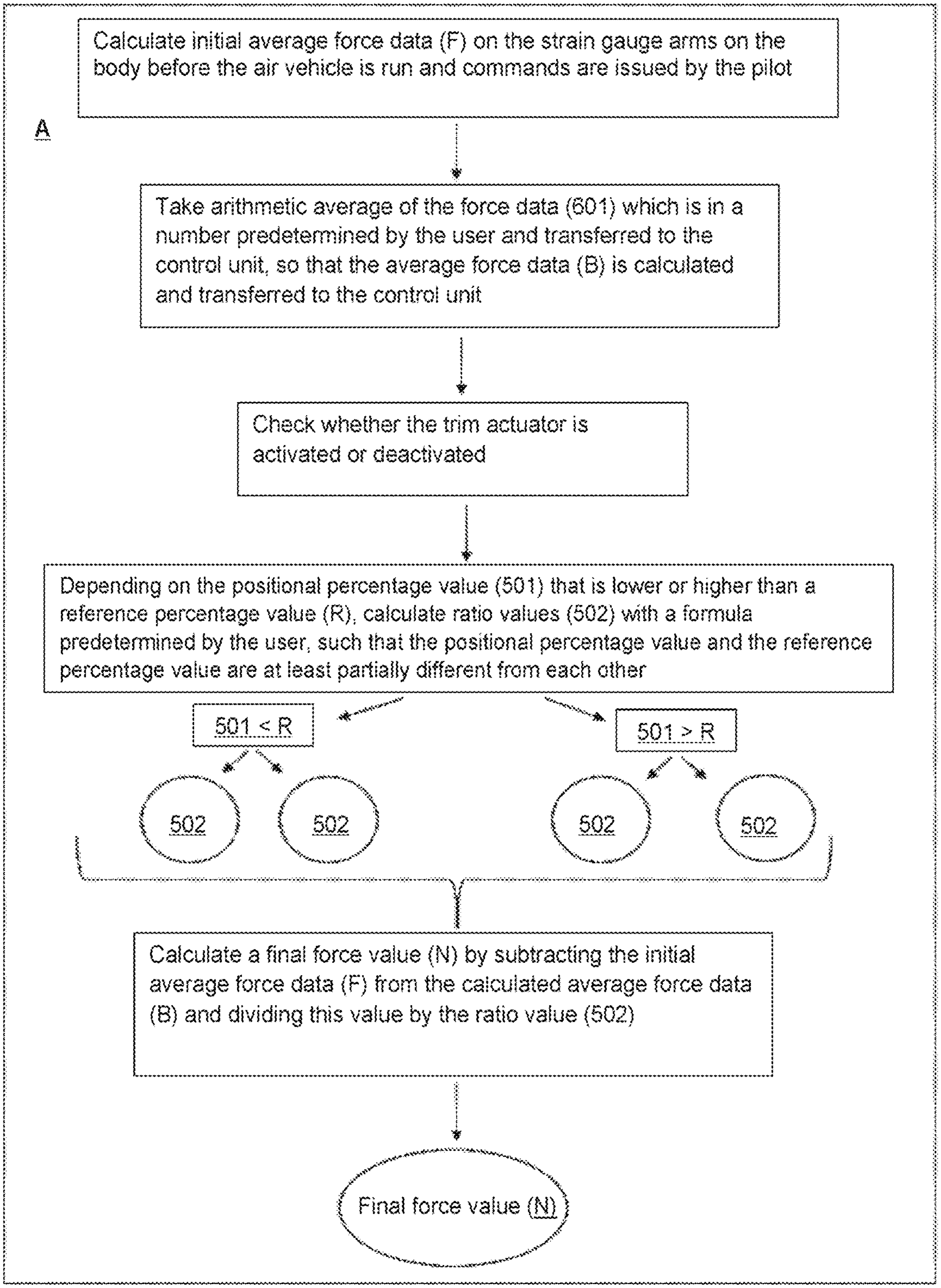

FIG. 2—is a schematic view of the algorithm flow chart in the control unit of the force measurement system.

All the parts illustrated in figures are individually assigned a reference numeral and the corresponding terms of these numbers are listed below:

1. Force measurement system
2. Body
3. Control stick
4. Strain gauge arm
5. Trim actuator
501. Positional percentage value
502. Raito value
6. Sensor
601. Force value
7. Control unit
(A) Algorithm
(F) Initial average force data
(B) Average force data
(R) Reference percentage value
(N) Final force value The force measurement system (1) comprises a body (2) located at an air vehicle; at least one control stick (3) extending outward from the body (2) and enabling the pilot to control tasks such as position and speed of the air vehicle; at least one strain gauge arm (4) located on the control line in connection with the control stick (3), which measures a strain transferred to the control stick (3); at least one trim actuator (5) located on the related strain gauge arm (4) on the control line, which measures positional changes of the air vehicle; at least one sensor (6) located on the strain gauge arm (4) and generating force data (601) at a rate predetermined by the user upon a force exerted on the control stick (3); at least one control unit (7) to which force data (601) received from sensors (6) and positional percentage values (501) received from trim actuator (5) are transmitted (FIG. 1).

The force measurement system (1) according to the invention comprises the control unit (7) having the following algorithmic (A) steps for the positional change movements of the air vehicle that allow:

- Calculating an initial average force data (F) on the strain gauge arms (4) on the body (2) before the air vehicle is operated and commands are issued by the pilot;
- Taking an arithmetic average of the force data (601) in a number predetermined by the user and transferred to the control unit (7), so that an average force data (B) is calculated and transferred to the control unit (7);
- Checking whether the trim actuator (5) is activated or deactivated;
- Depending on the positional percentage value (501) that is lower or higher than a reference percentage value (R) predetermined by the user, calculating and processing at least one ratio value (502) by the control unit (7) with a formula predetermined by the user, such that the positional percentage value (501) and the reference percentage value (R) are at least partially different from each other;
- Calculating a final force value (N) exerted by the pilot on the control stick (3) according to the position of the air vehicle, by subtracting the initial average force data (F) from the average force data (B) and dividing this value by the ratio value (502) that is calculated by the formula predetermined by the user;
- Calculating a final force value (N) exerted by the pilot on the control stick (3) according to the position of the air vehicle (FIG. 2).

Thanks to a body (2) located at an air vehicle, at least one control stick (3) extending outward from the body (2) and enabling the pilot to control tasks such as position and speed of the air vehicle, and the strain gauge arm (4) located in connection with the control stick (3), strain can be measured to determine the force acting on the control stick (3). In the control line on which the strain gauge arm (4) is located, positional changes of the air vehicle can be measured by at least one trim actuator (5). Since the strain gauge arm (4) transfers motion, it is possible to read the positional percentage value of the commands issued to the control stick (3), such as right-left turn, forward-backward, from the trim actuator (5). Thanks to the control unit (7), force data (601) received from at least one sensor (6) located on the strain gauge arm (4) for generating force data, upon the force exerted on the control stick (3), in a ratio predetermined by the user, and the positional percentage received from the trim actuator (5) values (501) can be transmitted.

Position information for force measurement is provided by trim actuators (5) without using any extra equipment while the system is in motion, thanks to the control unit (7) having the following algorithmic (A) steps that allow:

- Calculating an initial average force data (F) on the strain gauge arms (4) on the body (2) before the air vehicle is operated and commands are issued by the pilot;
- Taking an arithmetic average of the force data (601) in a number predetermined by the user and transferred to the control unit (7), so that an average force data (B) is calculated and transferred to the control unit (7);
- Checking whether the trim actuator (5) is activated or deactivated;
- Depending on the positional percentage value (501) that is lower or higher than a reference percentage value (R) predetermined by the user, calculating ratio values (502) by the control unit (7) with a formula predetermined by the user, such that the positional percentage value (501) and the reference percentage value (R) are at least partially different from each other;
- Calculating a final force value (N) exerted by the pilot on the control stick (3) according to the position of the air vehicle, by subtracting the initial average force data (F) from the average force data (B) and dividing this value by the ratio value (502) that is calculated by the formula predetermined by the user;
- Calculating a final force value (N) exerted by the pilot on the control stick (3) according to the position of the air vehicle.

In an embodiment of the invention, the force measurement system (1) comprises the control unit (7) having the algorithm (A) that calculates the final force value (N) exerted by the pilot on the equipment such as arms, pedals on the control stick (3), by means of the force data (601) regarding the force exerted by the pilot on the control stick (3) and received by the sensors (6) on the strain gauge arm (4) without direct contact with the pilot. Therefore, the final force value (N) exerted by the pilot on the control stick (3) according to the position of the air vehicle can be calculated without using any extra equipment. It is enabled that negative effects on the comfort of use during the flight are eliminated for the pilot.

In an embodiment of the invention, the force measurement system (1) comprises the control unit (7) which processes the force data (601) received by the sensors (6) located individually on each strain gauge arm (4) by means of the position information received from the trim actuators (5) located on the strain gauge arm (4) on the control line, wherein each strain gauge arm (4) is located in connection with the control stick (3) for control commands such as pitch-yaw movement, drift, etc., allowing individual measurement for each command. Therefore, the force data (601) received by the sensors (6) located individually on each strain gauge arm (4) are processed, so that the force exerted by the pilot on the control stick (3) is calculated.

In an embodiment of the invention, the force measurement system (1) comprises sensors (6) that measure force data (601) bidirectionally with a full bridge strain application by means of strain gauge arms (4). Thanks to the full bridge strain application, the force measurement accuracy in control systems is increased by means of the strain gauge arms (4) with less rigidity, since the strain value must be high so as not to be affected by noise.

In an embodiment of the invention, the force measurement system (1) comprises the control unit (7) which controls that the positional percent value (501) of the trim actuator (5) is between the previous and the next positional percent value (501). Thus, accuracy of the system is constantly confirmed by the control unit (7).

In an embodiment of the invention, the force measurement system (1) comprises the control unit (7) which calculates the final force value (N) by taking arithmetic average of the force data (601) measurements made by measuring the force data (601) via the strain gauge arm (4) in a number predetermined by the user.

In an embodiment of the invention, the force measurement system (1) comprises the control unit (7) which allows the user to obtain data in distinguishable numbers by dividing the measured average force data (B) by the ratio value (502) of the force data (601) calculated with formulas predetermined by the user. In an embodiment of the invention, the force measurement system (1) comprises the control unit (7) having the algorithm (A) that calculates the final force value (N) exerted by the pilot on the air vehicle control equipment located on the control stick (3), such as sticks and pedals, by means of the position information received by trim actuators (5) suitable for use in air vehicle flight tests, and force data (601) received by sensors (6). While the air vehicle is in the prototype stage, the final force value (N) exerted by the pilot on the air vehicle control equipment, such as sticks and pedals on the control arm (3), can be calculated.

In an embodiment of the invention, the force measurement system (1) comprises the body (2) located on the air vehicle which is a helicopter.

The invention claimed is:

1. A force measurement system (1) comprising:

a body (2) located at an air vehicle;

at least one control stick (3) extending outward from the body (2) and enabling the pilot to control tasks comprising position and speed of the air vehicle;

at least one strain gauge arm (4) located on the control line in connection with the control stick (3), which measures a strain transferred to the control stick (3);

at least one trim actuator (5) located on the related strain gauge arm (4) on the control line, which measures positional changes of the air vehicle;

at least one sensor (6) located on the strain gauge arm (4) and generating force data (601) at a rate predetermined by the user upon a force exerted on the control stick (3);

at least one control unit (7) to which force data (601) received from sensors (6) and positional percentage values (501) received from trim actuator (5) are transmitted wherein the control unit (7) has the following algorithmic (A) steps for the positional change movements of the air vehicle that allow:

calculating an initial average force data (F) on the strain gauge arms (4) on the body (2) before the air vehicle is operated and commands are issued by the pilot;

taking an arithmetic average of the force data (601) in a number predetermined by the user and transferred to the control unit (7), so that an average force data (B) is calculated and transferred to the control unit (7);

checking whether the trim actuator (5) is activated or deactivated;

depending on the positional percentage value (501) that is lower or higher than a reference percentage value (R) predetermined by the user, calculating and processing at least one ratio value (502) by the control unit (7) with a formula predetermined by the user, such that the positional percentage value (501) and the reference percentage value (R) are at least partially different from each other;

calculating a final force value (N) exerted by the pilot on the control stick (3) according to the position of the air vehicle, by subtracting the initial average force data (F) from the average force data (B) and dividing this value by the ratio value (502) that is calculated by the formula predetermined by the user; and calculating a final force value (N) exerted by the pilot on the air vehicle.

2. The force measurement system (1) according to claim 1, wherein the control unit (7) having the algorithm (A) that calculates the final force value (N) exerted by the pilot on the equipment on the control stick (3), by means of the force data (601) regarding the force exerted by the pilot on the control stick (3) and received by the sensors (6) on the strain gauge arm (4) without direct contact with the pilot.

3. The force measurement system (1) according to claim 1 wherein the control unit (7) processes the force data (601) received by the sensors (6) located individually on each strain gauge arm (4) by means of the position information received from the trim actuators (5) located on the strain gauge arm (4) on the control line, wherein each strain gauge arm (4) is located in connection with the control stick (3) for control commands, and thereby allowing individual measurement for each command.

4. The force measurement system (1) according to claim 1, wherein the sensors (6) measure force data (601) bidirectionally with a full bridge strain application by means of strain gauge arms (4).

5. The force measurement system (1) according to claim 1, wherein the control unit (7) controls that the positional percent value (501) of the trim actuator (5) is between the previous and the next positional percent value (501).

6. The force measurement system (1) according to claim 1, wherein the control unit (7) calculates the final force value (N) by taking an arithmetic average of the force data (601) measurements made by measuring the force data (601) via the strain gauge arm (4) in a number predetermined by the user.

7. The force measurement system (1) according to claim 1, wherein the control unit (7) allows the user to obtain data in distinguishable numbers by dividing the measured average force data (B) by the ratio value (502) of the force data (601) calculated with formulas predetermined by the user.

8. The force measurement system (1) according to claim 1, wherein the control unit (7) having the algorithm (A) that calculates the final force value (N) exerted by the pilot on the air vehicle control equipment located on the control stick (3), by means of the position information received by trim actuators (5) in air vehicle flight tests, and force data (601) received by sensors (6).

9. The force measurement system (1) according to claim 1, wherein the air vehicle is a helicopter.

* * * * *